United States Patent
Daly

(10) Patent No.: US 6,755,897 B2
(45) Date of Patent: Jun. 29, 2004

(54) CONSTANT VELOCITY RADIAL INFLOW PARTICLE SEPARATOR

(75) Inventor: Paul Desmond Daly, Troy, MI (US)

(73) Assignee: Siemens VDO Automotive Inc., Chatham, CA (US)

( * ) Notice: Subject to any disclaimer, the term of this patent is extended or adjusted under 35 U.S.C. 154(b) by 0 days.

(21) Appl. No.: 10/278,406

(22) Filed: Oct. 23, 2002

(65) Prior Publication Data

US 2004/0079229 A1 Apr. 29, 2004

(51) Int. Cl.⁷ .............................................. B01D 45/12
(52) U.S. Cl. ........................... 95/271; 55/337; 55/420; 55/459.1; 55/459.5
(58) Field of Search ......................... 55/337, 418, 420, 55/459.1, 459.5; 95/269, 271

(56) References Cited

U.S. PATENT DOCUMENTS

| | | | |
|---|---|---|---|
| 3,577,728 A | * | 5/1971 | Von Brimer et al. .......... 60/283 |
| 4,217,118 A | | 8/1980 | Kopf et al. |
| 4,592,765 A | | 6/1986 | Breitman et al. |
| 4,606,743 A | * | 8/1986 | Shuman ........................ 55/323 |
| 5,039,317 A | | 8/1991 | Thompson et al. |
| 5,536,289 A | * | 7/1996 | Spies et al. ................. 55/459.5 |
| 5,551,387 A | | 9/1996 | Carter et al. |
| 5,569,311 A | | 10/1996 | Oda et al. |
| 5,596,961 A | | 1/1997 | Faber |
| 5,603,295 A | | 2/1997 | Topfer et al. |
| 5,623,900 A | | 4/1997 | Topfer et al. |
| 5,653,201 A | | 8/1997 | Hosoya |
| 5,657,727 A | | 8/1997 | Uchida |
| 5,660,243 A | | 8/1997 | Anzalone et al. |
| 5,832,890 A | | 11/1998 | Ikeya et al. |
| 5,860,685 A | | 1/1999 | Horney et al. |
| 5,870,987 A | | 2/1999 | Ikeya et al. |
| 5,893,937 A | | 4/1999 | Moessinger |
| 5,896,838 A | | 4/1999 | Pontopiddan et al. |
| 5,918,572 A | | 7/1999 | Suzuki |
| 5,964,194 A | | 10/1999 | Pontopiddan et al. |
| 6,009,863 A | | 1/2000 | Tochizawa |
| 6,024,066 A | | 2/2000 | Nakayama et al. |
| 6,026,775 A | | 2/2000 | Yamane |
| 6,056,075 A | | 5/2000 | Kargilis |
| 6,062,927 A | | 5/2000 | Hiraoka et al. |
| 6,089,199 A | | 7/2000 | Lohr et al. |
| 6,092,498 A | | 7/2000 | Lohr et al. |
| 6,095,105 A | | 8/2000 | Lohr et al. |
| 6,098,586 A | | 8/2000 | Bloomer |
| 6,134,874 A | | 10/2000 | Stoten |
| 6,142,114 A | | 11/2000 | Yoshikawa |
| 6,379,411 B1 | * | 4/2002 | Turner et al. .................. 55/394 |

* cited by examiner

*Primary Examiner*—Robert A. Hopkins

(57) ABSTRACT

A vehicle air cleaner system 10 includes a cyclone chamber 14 and a variable inlet 30. The variable inlet 30 communicates airflow to the cyclone chamber 14 at a relatively constant velocity by varying an opening 32 in response to airflow which enters the inlet 12. During a relatively low airflow condition the variable inlet 30 directs airflow closer to a center of the cyclone chamber 14 which increase the angular velocity of the airflow by directing airflow toward smaller radii 42s within the cyclone chamber. During a relatively high airflow condition the variable inlet directs airflow toward the outer diameter of the cyclone chamber 14 and larger radii 42 L to assure an angular speed sufficient to separate out undesirable particles yet prevent an undesirable pressure drop across the air cleaner system 10. By varying communication of airflow to particular radii within the cyclone chamber 14, a relatively constant pressure drop across the air cleaner system 10 is provided regardless of airflow velocity.

14 Claims, 3 Drawing Sheets

CONSTANT VELOCITY RADIAL INFLOW PARTICLE SEPARATOR

BACKGROUND OF THE INVENTION

The present invention relates to the removal of particulate from a flow of ambient air, and more particularly to a vehicle air cleaner which provides a constant intake airflow velocity.

Vehicles commonly include an air cleaner system which removes particulate matter from airflow which is provided to a vehicle engine. Air cleaning is frequently achieved by cyclone-type devices which communicate intake airflow about a series of offset radiuses to separate out undesirable particles through centripetal acceleration.

Conventional cyclone-type devices must provide a high angular speed at low airflow to assure an angular speed sufficient to separate out the undesirable particles. The low airflow condition may be of particular concern as the vehicle is typically stationary or slowly moving and more likely to be surrounded by a large volume of undesirable particles. However, by designing the cyclone-type device to provide sufficient angular speed in the low airflow condition, the angular velocity through the cyclone-type device will be quite high when the vehicle is travelling at high speed. This high airflow condition generates a relatively large pressure drop across the air cleaner system which may decrease engine power through air starvation.

Accordingly, it is desirable to provide an air cleaner system which effectively removes particulate matter while maintaining a relative constant airflow velocity.

SUMMARY OF THE INVENTION

The vehicle air cleaner system according to the present invention includes a cyclone chamber. The particles are separated from the airflow through centripetal acceleration such that the relatively heavier undesirable particles are ejected through apertures in an outer surface of the cyclone chamber. A conventional media filter is located adjacent an outlet to provide additional filtration of the airflow prior to communication to a vehicle engine.

A variable inlet is located within the inlet to the cyclone chamber. The variable inlet communicates airflow to the cyclone chamber at a relatively constant velocity by varying an opening in response to airflow.

One variable inlet includes a piston which selectively restricts the inlet. During a relatively low airflow condition the piston is maintained toward a restricted position. The restricted position increases the angular velocity of the airflow by directing airflow toward smaller radii within the cyclone chamber. During a relatively high airflow condition the airflow through the variable inlet is directed toward the outer diameter of the cyclone chamber and larger radii to assure an angular speed sufficient to separate out undesirable particles yet prevent an undesirable pressure drop across the air cleaner system. By varying communication of airflow to particular radii within the cyclone chamber, a relatively constant pressure drop across the air cleaner system is provided regardless of airflow velocity.

Another variable inlet includes a movable valve which varies the variable inlet in response to a controller. During a high airflow condition, the valve is opened to lower the angular velocity of the airflow by directing airflow toward a larger radius. During a low airflow condition, the valve is closed to increase the angular velocity of the airflow by directing airflow toward the smaller radiuses. As the value is independently powered, the valve may be operated to compensate for conditions no directly related to airflow velocity.

The present invention therefore effectively removes particulate matter while maintaining a relative constant airflow velocity therethrough.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
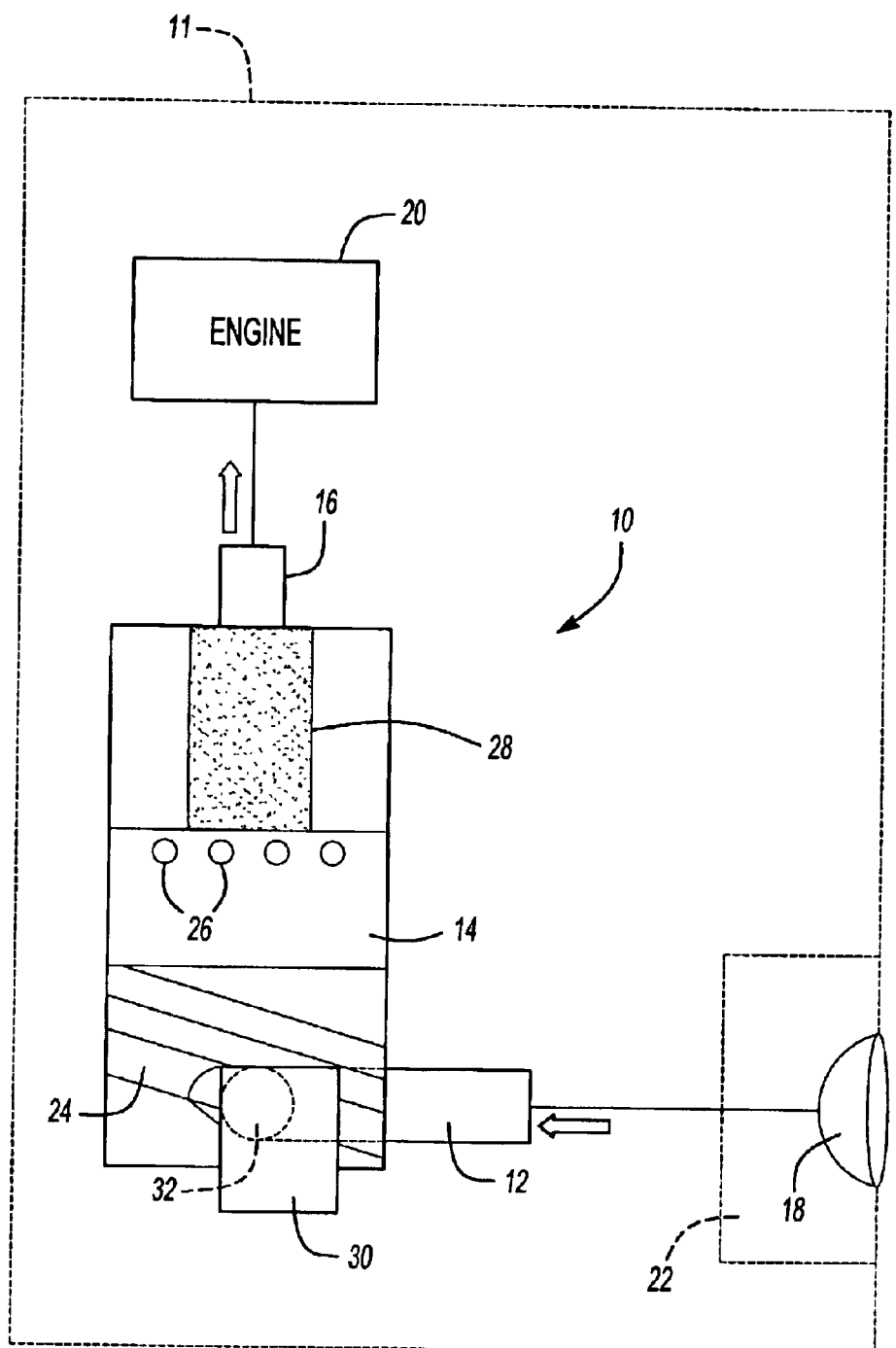
FIG. 1 is a schematic sectional view of a vehicle air cleaner system according to the present invention.

FIG. 1 illustrates a general sectional view of an air cleaner system 10 for a vehicle (illustrated schematically at 11). The system 10 includes an inlet 12, a cyclone chamber 14 and an outlet 16. The inlet 12 communicates ambient air from an intake 18 to the cyclone chamber and the outlet communicates cleaned air from the cyclone chamber 14 to vehicle engine 20. Intake 18 is typically placed in a vehicle location 22 which provides sufficient airflow for operation of the engine 20. It should be understood that various intake systems and power plants will benefit from the present invention.

The cyclone chamber 14 preferably includes a series of offset cylinders 24 (best seen in FIGS. 2 and 3) which rotate airflow from the inlet 12 at an angular speed sufficient to separate out undesirable particles. It should be understood that other cyclone configurations such as spirals and other configurations which provide an angular velocity will benefit from the present invention. Undesirable particles are separated from the airflow through centripetal acceleration such that the relatively heavier undesirable particles are ejected from apertures 26 through an outer surface of the cyclone chamber 14. A conventional media filter 28 is located adjacent the outlet 16 to provide additional filtration of the airflow prior to communication to the engine 20.

A variable inlet 30 is preferably located within the inlet 12. The variable inlet 30 communicates airflow to the cyclone chamber 14 at a relatively constant cyclone airflow velocity by varying an opening 32 in response to airflow (illustrated schematically by arrow A) which enters the inlet 12. Cyclone airflow velocity is defined herein as revolutions per second. It should be understood that the intake airflow A will vary in velocity due at least to engine and vehicle speed, however, by adjusting the variable inlet 30 the airflow velocity entering the cyclone chamber is managed to be relatively constant.

Figure 2:
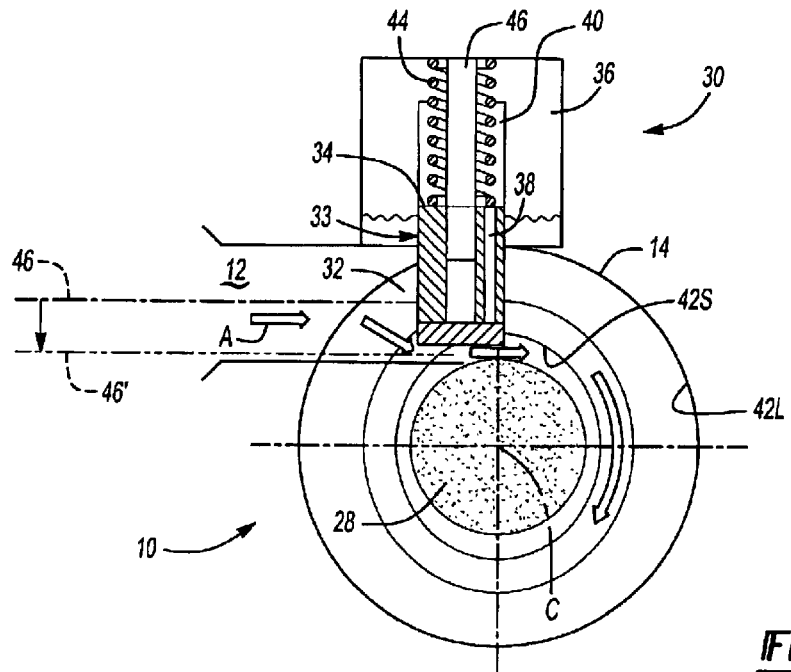
FIG. 2 is a schematic view of an air cleaner system in a first position.

Referring to FIG. 2, a flex diaphragm system 33 having a pressure-balanced piston 34 varies the variable inlet 30 and the airflow A through inlet 12. The piston 34 moves within a sealed chamber 36 to selectively restrict the opening 32 and offset airflow therethrough. The sealed chamber 36 communicates with the cyclone chamber 14 and the pressure therein through a passage 38. The pressure-balanced piston 34 is balanced by communication of pressure between the cyclone chamber 14 and a volume 40 within chamber 36 through passage 38. A biasing member such as a spring 44 drives the piston 34 along a guide 46 to bias the piston 34 toward a closed or restricted position.

The piston 34 selectively restricts the inlet 12 in response to the airflow A. During a relatively low airflow condition the piston 34 is maintained toward the restricted position by the bias of spring 44. The piston 34 in the restricted position provides a relatively small opening 32 which is closer to a center C of the cyclone chamber 14. That is, a longitudinal center axis 46 of opening 32 shifts toward center C (as represented by phantom axis 46'). Air flow A through variable inlet 30 is thereby directed toward the center C of the cyclone chamber 14 which increase the angular velocity of the airflow by directing airflow toward the smaller radii 42s. Thus, even during a relatively low airflow condition the variable inlet 32 assures an angular velocity sufficient to separate out undesirable particles.

Figure 3:
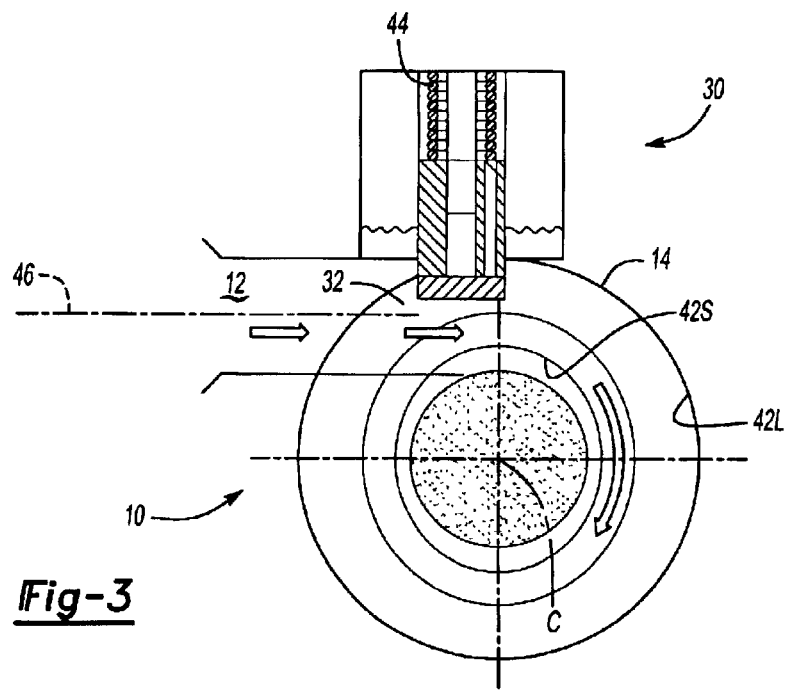
FIG. 3 is a schematic view of the air cleaner system of FIG. 2 in a second position.

During a relatively high airflow condition the pressure within volume 40 operates effectively as a vacuum relative the cyclone cylinder 14 to overcome the spring 44 and pull the piston 34 toward the unrestricted position (FIG. 3). The piston 34 in the unrestricted position provides a relatively large opening 32 through variable inlet 30 which is offset away from the center C of the cyclone chamber 14. Air flow A through variable inlet 30 is thereby directed toward the larger diameter of radii 42 L of the cyclone chamber 14 which effectively lowers the angular velocity. The angular velocity is sufficient to separate out undesirable particles yet prevents an undesirable pressure drop across the air cleaner system 10. By varying communication of airflow to particular radii within the cyclone chamber, a relatively constant pressure drop across the air cleaner system is provided regardless of airflow velocity. That is, the cyclone airflow velocity is maintained substantially constant through communication with particular radii.

Figure 4:
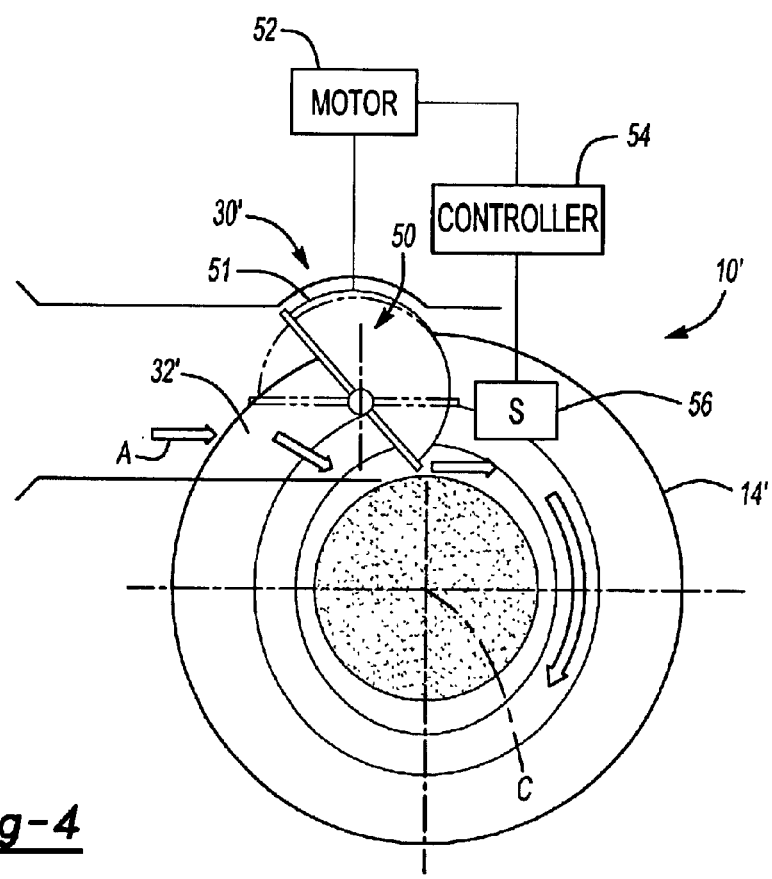
FIG. 4 is a schematic view of another air cleaner system in a first position.

Referring to FIG. 4, another vehicle air cleaner system 10' is illustrated. A movable valve 50 varies the variable inlet 30' and the airflow A through opening 32. The valve 50 preferably includes a hemi-circular portion 51 which matches the inner surface of the variable inlet 32'. Opening and closing of the valve 50 offsets airflow therethrough.

The valve 50 is rotated between an opened (in phantom) and closed position by an electric motor 52 or the like. A controller 54 which communicates with a sensor 56 located within the cyclone chamber 14' drives the motor 52. In response to the sensor 56, the controller 54 selectively moves the valve 50 to mask a portion of the variable inlet 32' and offset the airflow A relative the center C of the cyclone chamber 14'.

During a high airflow condition, the valve 50 is opened to lower the angular velocity of the airflow by directing airflow toward larger radii 42 L. During a low airflow condition, the valve 50 is closed to increase the angular velocity of the airflow by directing airflow toward smaller radii.

Controller 54 preferably includes logic to operate the valve 50 in response to predetermined conditions. That is, as the valve 50 is operated by the motor 52, the air cleaner system 10' is operated to compensate for conditions not directly related to airflow velocity. For example, controller 54 may operate the air cleaner system 10' at a relatively higher angular velocity in response to the detection of a high concentration of particulate, the engine is operating at high wear condition, and/or the media filter 28 is wet and/or full.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle air cleaner system comprising:
   a cyclone chamber;
   a variable inlet which defines an axis; and
   a flex diaphragm system transverse the axis which selectively extends at least partially into the cyclone chamber to selectively direct airflow within said cyclone chamber to maintain a relatively constant cyclone airflow velocity.

2. The vehicle air cleaner system as recited in claim 1, wherein said flex diaphragm system comprises a biased pressure balanced piston.

3. The vehicle air cleaner system as recited in claim 2, wherein said biased pressure-balanced piston selectively extends at least partially within said cyclone chamber.

4. The vehicle air cleaner system as recited in claim 3, wherein said biased pressure-balanced piston offsets the airflow toward one of a plurality of offset radii to maintain a relatively constant cyclone airflow velocity.

5. The vehicle air cleaner system as recited in claim 1, wherein said cyclone chamber comprises a plurality of offset radii.

6. The vehicle air cleaner system as recited in claim 1, further comprising a media filter adjacent an outlet from said cyclone chamber.

7. A method of operating an air cleaner system comprising the steps of:
   (1) directing airflow into a cyclone chamber; and
   (2) extending a biased pressure-balanced piston transverse an axis defined by an inlet and at least partially into the cyclone chamber to selectively restrict the inlet to maintain relatively constant cyclone airflow velocity.

8. A method as recited in claim 7, further comprising the step of:
   (a) offsetting the airflow to one of a plurality of radii within the cyclone chamber with the biased pressure-balanced piston.

9. A method as recited in claim 7, wherein said step (1) further comprises increasing the angular velocity to compensate for predetermined air cleaner system conditions.

10. A method of operating an air cleaner system comprising the steps of:
    (1) controlling an inlet to the cyclone chamber to maintain a relatively constant cyclone airflow velocity;
    (2) extending a biased pressure-balanced piston transverse an axis defined by the inlet and at least partially into the cyclone chamber; and
    (3) Offsetting the airflow within the inlet with the biased pressure-balanced piston toward one of a plurality of radii within the cyclone chamber.

11. A method as recited in claim 10, wherein said step (2) further comprises increasing an angular velocity of the airflow within the cyclone chamber in response to a predetermined air cleaner system condition.

12. A vehicle air cleaner system comprising:
    a cyclone chamber;

a variable inlet which selectively restricts airflow to said cyclone chamber to maintain a relatively constant cyclone airflow velocity;

a movable valve to vary an opening within said variable inlet, said movable valve comprises a hemi-circular portion to at least partially block said opening within said variable inlet.

13. The vehicle air cleaner system as recited in claim 12, further comprising a motor to rotate said movable valve.

14. A vehicle air cleaner system comprising:

a cyclone chamber;

a variable inlet which defines an axis; and a movable valve transverse the axis which selectively extends at least partially within said cyclone chamber to offset an airflow toward one of a plurality of offset radii to maintain a relatively constant cyclone airflow velocity.

* * * * *